United States Patent [19]

Jain

[11] 4,371,873
[45] Feb. 1, 1983

[54] CLUTTER FREE SYNTHETIC APERTURE RADAR CORRELATOR

[76] Inventor: Robert A. Frosch, Administrator of the National Aeronautics and Space Administration, with respect to an invention of Atul Jain, Pasadena, Calif.

[21] Appl. No.: 858,767

[22] Filed: Dec. 8, 1977

[51] Int. Cl.³ .............. G01S 13/89; G01S 13/90
[52] U.S. Cl. .............. 343/9 PS; 343/5 CM; 343/100 CL
[58] Field of Search .............. 343/5 CM, 100 CL, 17, 343/9 PS

[56] References Cited

U.S. PATENT DOCUMENTS

| 3,344,419 | 9/1967 | Lund | 343/5 R |
| 3,355,579 | 11/1967 | Robertson | 343/100 CL X |
| 3,398,269 | 8/1968 | Williams | 343/100 CL X |
| 3,483,557 | 12/1969 | Skenderoff et al. | 343/100 CL |
| 3,526,893 | 9/1970 | Skenderoff et al. | 343/100 CL |
| 3,560,973 | 2/1971 | Kazel | 343/5 CM |
| 3,889,226 | 6/1975 | Hildebrand | 343/17 X |
| 3,953,822 | 4/1976 | Vilkomerson | 343/17 X |
| 4,019,184 | 4/1977 | Dorey | 343/100 CL X |
| 4,042,928 | 8/1977 | Altes | 343/100 CL X |

OTHER PUBLICATIONS

"Speckle Removal by a Slowly Moving Diffuser Associated with a Motionless Diffuser", by S. Lowenthal et al., Journal of Optical Society of America, vol. 61, No. 7, p. 847, (1971).
"A Speckle—Free Rear—Projection Screen Using Two Closed Screens with Slow Relative Motion", J. Optical Society of America, vol. 66, p. 176, (1976).

Primary Examiner—Malcolm F. Hubler
Attorney, Agent, or Firm—Monte F. Mott; John R. Manning; Paul F. McCaul

[57] ABSTRACT

A synthetic aperture radar correlation system including a moving diffuser located at the image plane of a radar processor. The output of the moving diffuser is supplied to a lens whose impulse response is at least as wide as that of the overall processing system. A significant reduction in clutter results.

6 Claims, 2 Drawing Figures

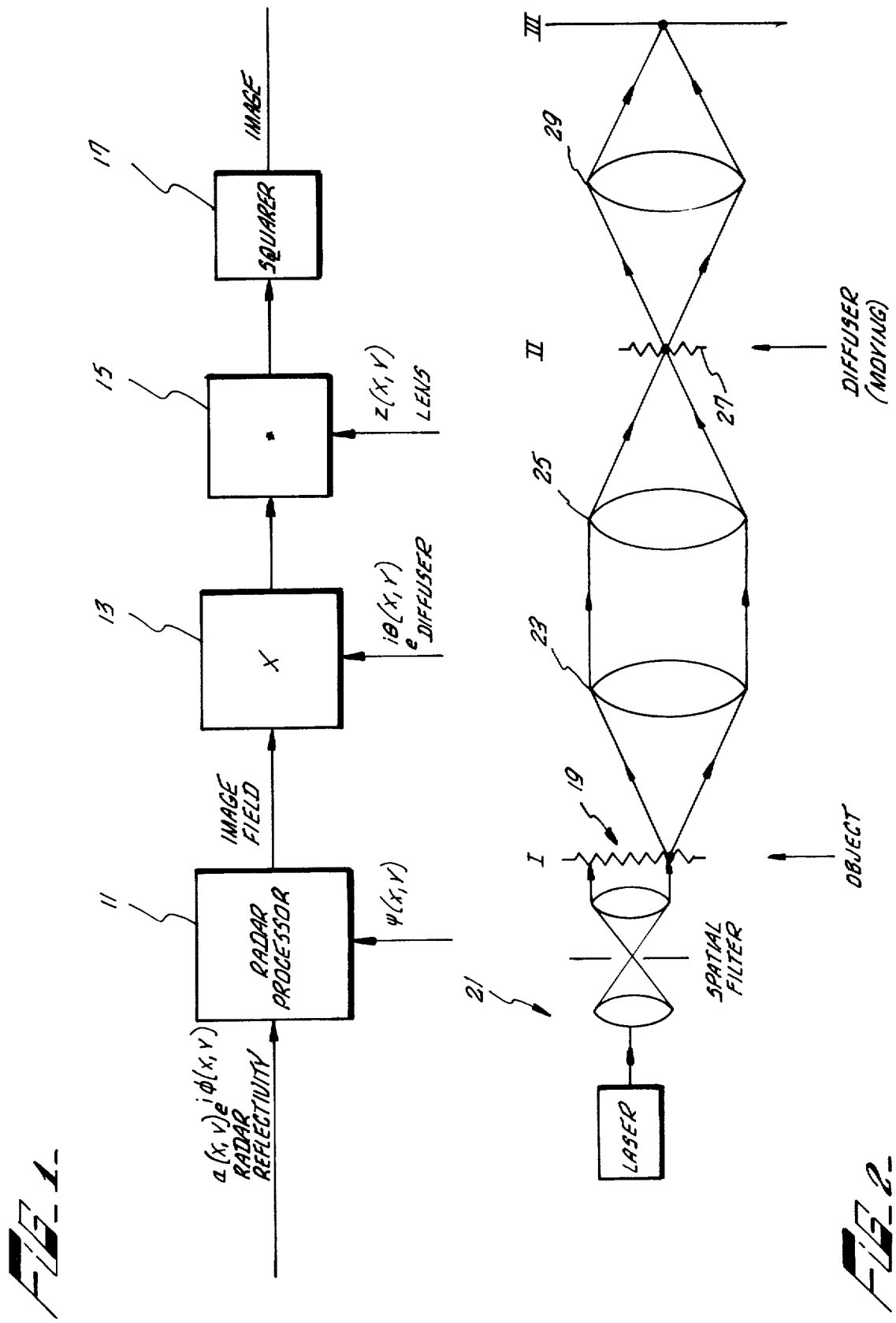

CLUTTER FREE SYNTHETIC APERTURE RADAR CORRELATOR

BACKGROUND OF THE INVENTION

The subject invention relates to a synthetic aperture radar correlator that allows high resolution processing of synthetic aperture radar data using the image capabilities of the full azimuth and doppler bandwidth without the clutter noise degradation.

Clutter or speckle has been long known to limit the working resolution of images obtained with coherent radiation. Images obtained by synthetic aperture radar systems suffer from the same drawback and it has, therefore, been of considerable interest to explore various techniques for the reduction of the radar speckle in these images. The conventional technique of achieving incoherent averaging of the radar speckle, which involves adding images obtained from different sections of the radar bandwidth, has the disadvantage of a limited number of possible looks due to the loss of resolution associated with the narrower doppler bandwidth used for each independent look.

SUMMARY OF THE INVENTION

It is therefore an object of the invention to improve synthetic aperture radar systems.

It is another object of the invention to substantially increase the number of looks possible in a synthetic aperture radar system without loss of resolution.

These and other objects and advantages are accomplished according to the invention by using a diffuser in motion at the image plane of the radar processor and reimaging this diffuser with a lens whose impulse response is at least as wide as the impulse response of the radar system. While each independent position of the diffuser corresponds to an independent look in the speckle averaging process, the final resolution of the radar system is determined by the impulse response of this output lens. With this arrangement, the number of looks can be made very large with a limited loss of resolution.

BRIEF DESCRIPTION OF THE DRAWINGS

FIG. 1 is a block diagram illustrating the use of a moving diffuser to reduce speckle according to the preferred embodiment of the invention.

FIG. 2 illustrates an optical system simulating that of FIG. 1.

DETAILED DESCRIPTION OF THE PREFERRED EMBODIMENT

FIG. 1 illustrates a radar system including a conventional radar processor 11, a moving diffuser 13 at the image plane of the radar processor, an output lens 15, and a squarer 17 which represents the recording process of the film. The construction and operation of a moving diffuser 13, as an individual element, is well-known to those skilled in the art. By using such a diffuser 13 according to the inventive embodiment of FIG. 1, a surprising improvement in the radar image occurs.

The radar processor 11 provides a radar image field plane. The moving diffuser 13 is located at the image field plane of the processor 11. As the diffuser 13 moves, it provides an output image to the lens 15, which has an impulse response at least as wide as the impulse response of the overall radar system including processor 11, diffuser 13, lens 15 and squarer 17. The lens 15 reimages the diffuser output image and outputs to the film processing apparatus represented by the squarer 17. The following discussion illustrates in more detail the operation of the radar system of FIG. 1.

In FIG. 1, the terrain reflectivity is $\rho(x,y)$ and generally consists of a real term $\alpha(x,y)$ and a pure phase function $\exp[i\phi(x,y)]$ arising from the surface roughness of the terrain. The reflectivity $\rho(x,y)$ is convolved by the radar impulse response $\psi(x,y)$ to give the results field in the radar image plane. This result is operated on by the diffuser phase transmittance $\exp[i\theta(x,y)]$ and then convolved by the impulse response of the output lens $z(x,y)$ and the output is amplitude squared by the recording process of the film. Each independent position of the diffuser corresponds to an independent $\theta_r(x,y)$, and the corresponding images in the output plane are added together to provide the resulting speckle averaging.

To show that this arrangement does not lead to a blurring of the radar image, consider $\rho(x,y)$ to be the delta function $\delta(x-x_i, y-y_j)$. Then the output image for each $\theta_4(x,y)$, is $\psi(x-x_i,y-y_j) \exp[i\theta_r(x,y)]*z(x,y)$. The location and width of this function is independent of the value of $\theta_r(x,y)$. To show that independent values of $\theta_r(x,y)$ result in independent speckle patterns, one notes first that the electric field for one particular value of $\theta_r(x,y)$ in the output plane is $$e_r(x,y) = [\{\rho(x,y)*\psi(x,y)\} \exp[i\theta_r(x,y)]*z(x,y)] \quad (1)$$

and the corresponding image intensity is $u_r(x,y) = e_r(x,y)e_r^*(x,y)$. If $z(x,y)$ is wider than $\psi(x,y)$ and $\theta(x,y)$ and $\phi(x,y)$ have white noise Gaussian statistics then $e_r(x,y)$ may be assumed to have Gaussian statistics. We can, therefore, write the cross correlation of the intensities $u_r(x,y)$ and $u_m(x,y)$, recorded for the two independent descriptions of the diffuser, $\theta_r(x,y)$ and $\theta_m(x,y)$ respectively, as, $$<u_r(x,y)u_m^*(x,y)> = <u_r(x,y)><u_m^*(x,y)> + |<e_r(x,y)e_m^*(x,y)>|^2 \quad (2)$$

where the brackets $<>$ denote the expectation value. By definition, therefore, the two intensities may be considered uncorrelated if $<e_4(x,y)e_m^*(x,y)>$ is negligible. By substituting (1) for $e_r(x,y)$ and $e_m(x,y)$ and rearranging terms, we obtain the result $$<e_r(x,y)e_m^*(x,y)> = [\{<\rho(x,y)\rho^*(x,y)>*R_\psi(0,0)\}<\exp[i(\theta_r(x,y)-\theta_m(x,y))]>*R_z(0,0)] \quad (3)$$

where $R_\psi(0,0)$ is the auto correlation of $\psi(x,y)$ for the value $(0,0)$ and $R_z(0,0)$ the corresponding auto correlation of $z(x,y)$ and the symbol * is the convolution symbol. If $\theta_r(x,y)$ and $\theta_m(x,y)$ are independent, then $<\exp[i(\theta_r(x,y)-\theta_m(x,y))]>$ is zero and the expression (3) is approximately zero. Thus, the speckle patterns from the two independent positions of the diffuser will be uncorrelated and a superposition of the intensities from independent positions of the diffuser will result in an effective smoothing of the speckle noise.

An optical illustration of the concept of the invention is shown in FIG. 2. In this system, a rough target 19 is illuminated by a laser system 21 and imaged by two lenses 23, 25. The lens system comprising lenses 23, 25 images the rough object 19 into the moving diffuser 27 at plane II. The image provided by the diffuser 27 is then reimaged by another lens 29. Such a system can be used to optically simulate the preferred embodiment.

In conclusion, by placing a diffuser in the image plane of the radar processor, and reimaging this with a lens whose impulse response is not narrower than the impulse response of the radar system, an effective speckle averaging takes place if indepdent images obtained for independent positions of the diffuser are added together, with resulting improvement in feature discrimination capability. The foregoing technique can be implemented in both the optical and the digital or analog electronic processors.

As may be appreciated, the just described preferred embodiment is subject to many adaptations and modifications without departing from the scope and spirit of the invention.

It is therefore to be understood that, within the scope of the appended claims, the invention may be practiced other than as specifically described herein.

What is claimed is:

1. A radar processing system supplied with terrain reflectivity and radar impulse response indications comprising:
   a radar processor means for providing a radar image field plane;
   a moving diffuser located at the image field plane of said radar processor and providing an output image; and
   a lens means having an impulse response at least as wide as the impulse response of the radar system, for reimaging said output image.
2. The system of claim 1 further including means for squaring the output of said lens means.
3. The system of claim 1 wherein said lens means has an impulse response wider than the impulse response of the radar system.
4. The system of claim 1 wherein said radar processor means is an optical processor.
5. The system of claim 1 wherein said radar processor means is an electronic digital processor.
6. The system of claim 1 wherein said radar processor means is an electronic analog processor.

* * * * *